July 10, 1923.

M. McCANN

SEWING MACHINE

Filed Sept. 23, 1919   9 Sheets-Sheet 1

1,461,428

WITNESSES:
Gustav Genzlinger

INVENTOR.
Michael McCann
BY
Francis Chambers
his ATTORNEY

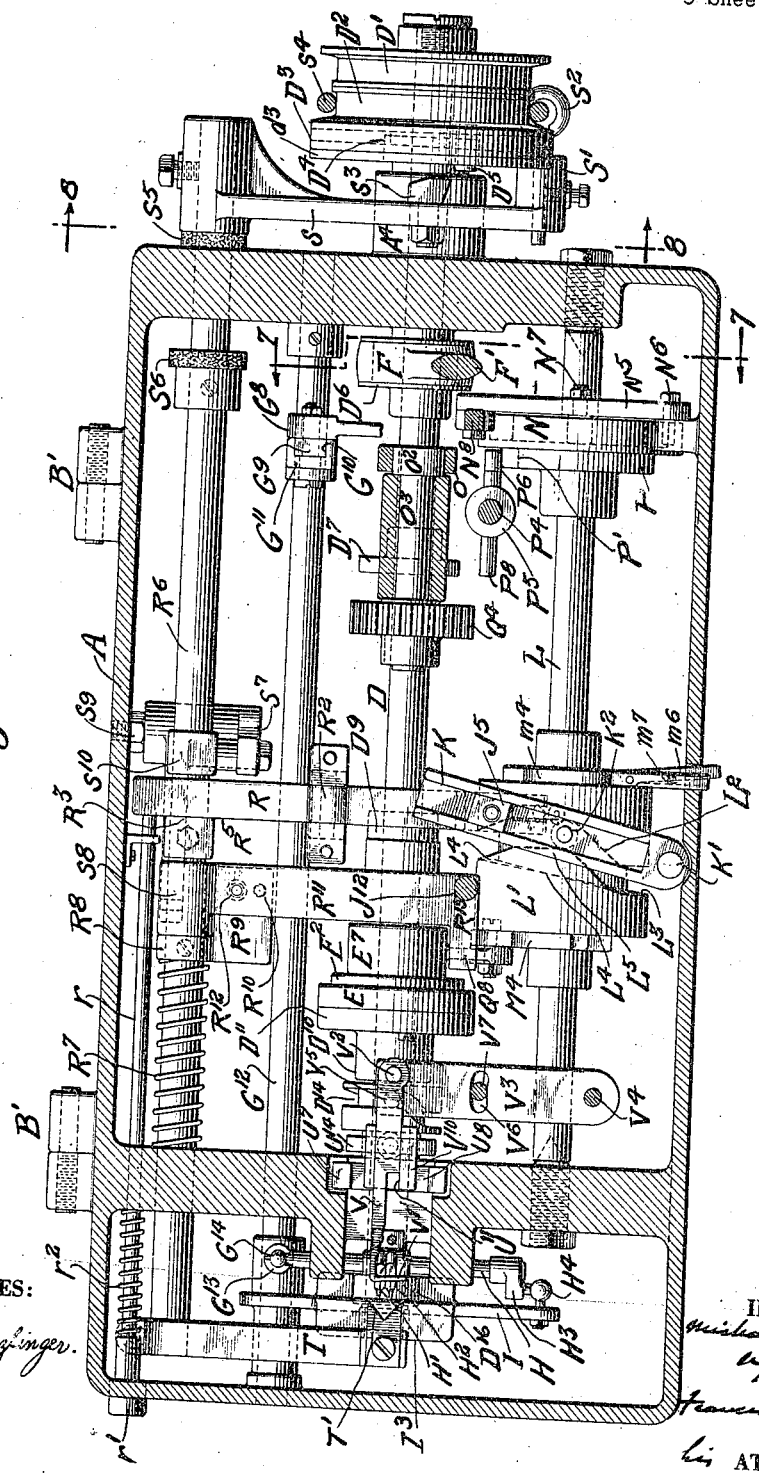

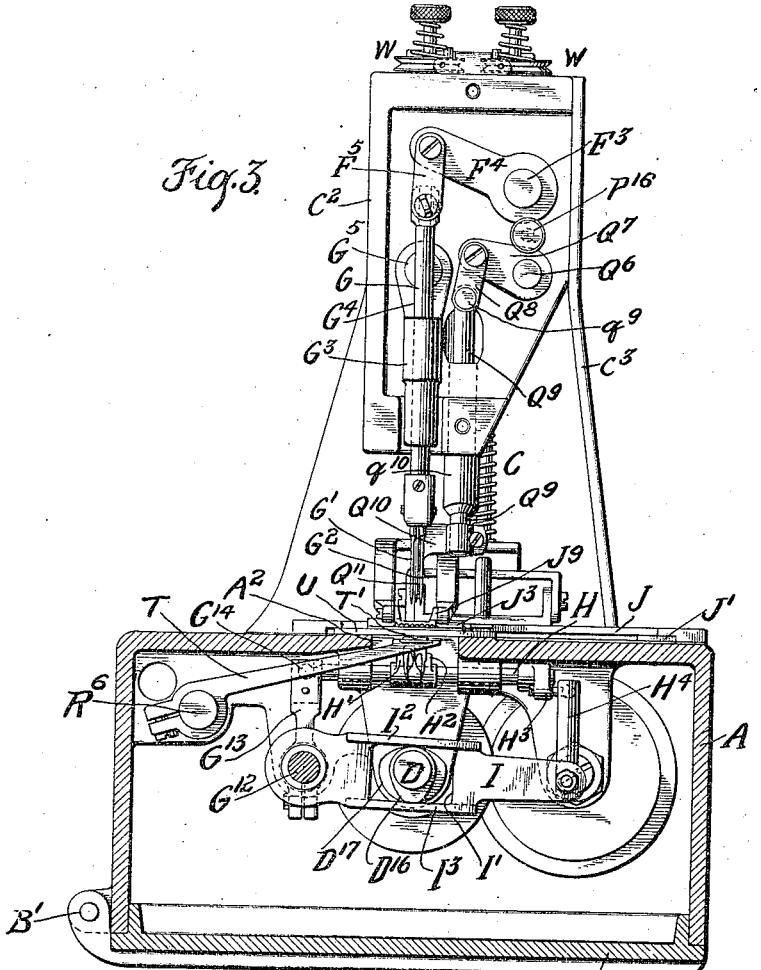

July 10, 1923.
M. McCANN
SEWING MACHINE
Filed Sept. 23, 1919
1,461,428
9 Sheets-Sheet 4
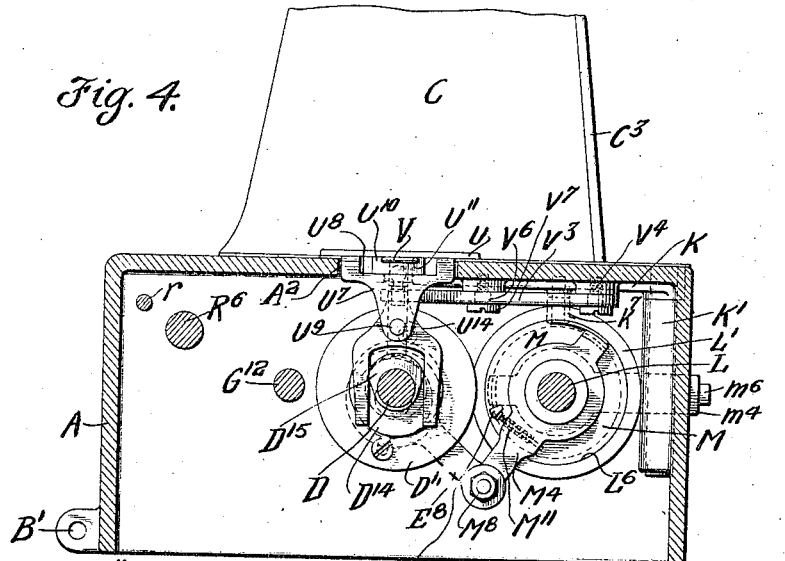
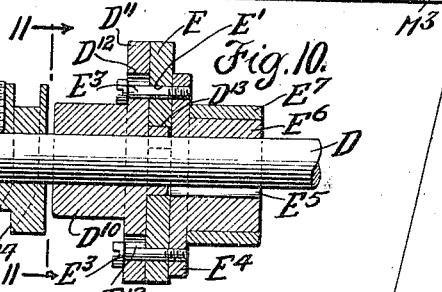
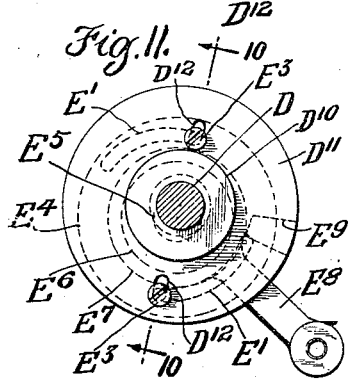
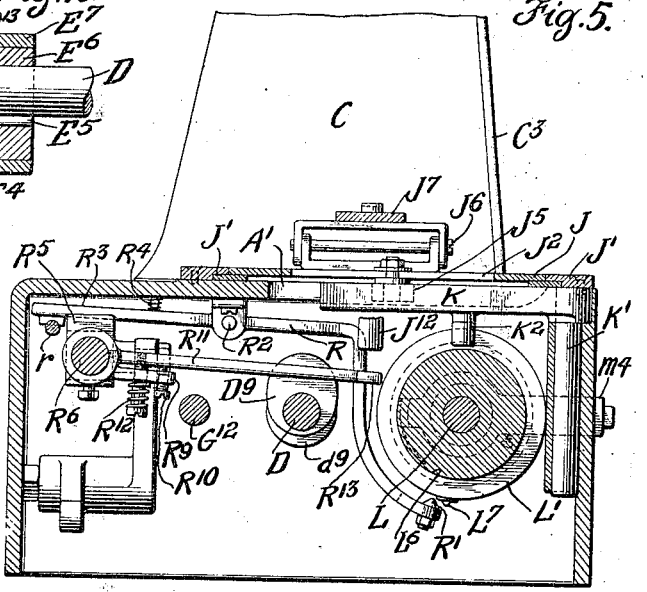
WITNESSES:
Gustav Genzlinger
INVENTOR.
Michael McCann
BY
Francis X Chambers
his ATTORNEY July 10, 1923.

M. McCANN 1,461,428

SEWING MACHINE

Filed Sept. 23, 1919

WITNESSES:
Gustav Benzinger

INVENTOR.
Michael McCann
BY
Francis J. Chambers
his ATTORNEY

July 10, 1923.
M. McCANN
SEWING MACHINE
Filed Sept. 23, 1919
1,461,428
9 Sheets-Sheet 6
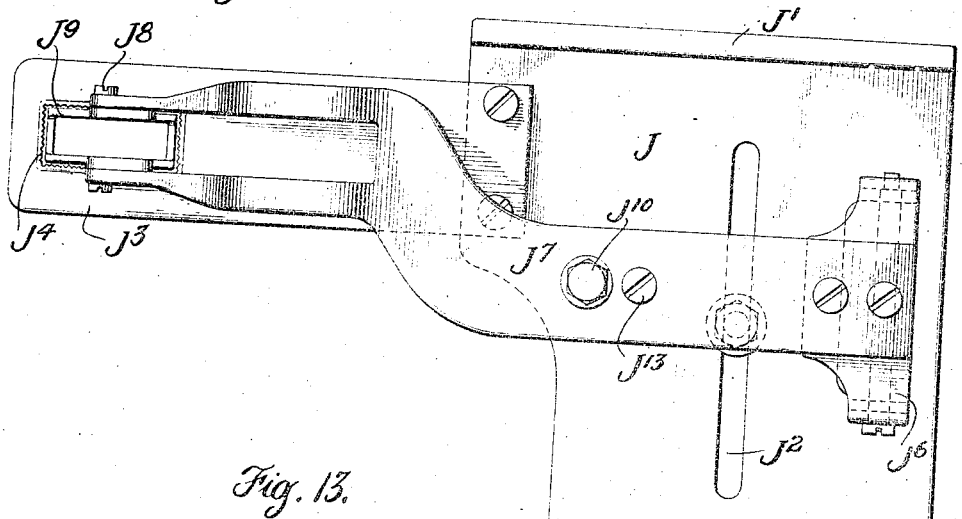
Fig. 12.
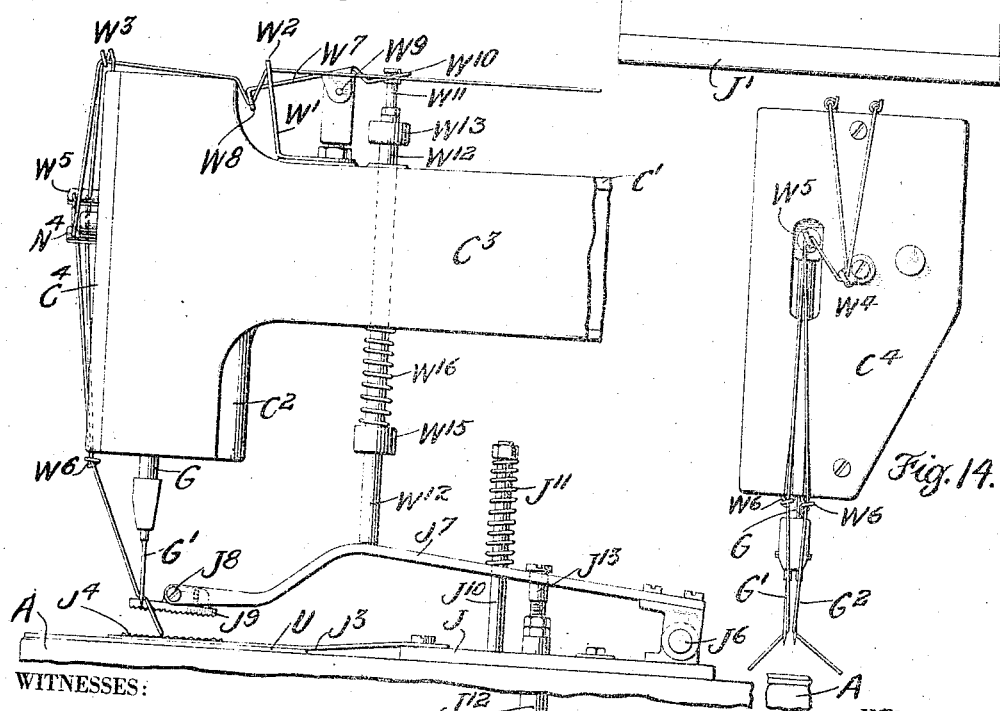
Fig. 13.
Fig. 14.
WITNESSES:
Gustav Genzlinger
INVENTOR.
Michael McCann
BY
Francis T. Chambers
ATTORNEY

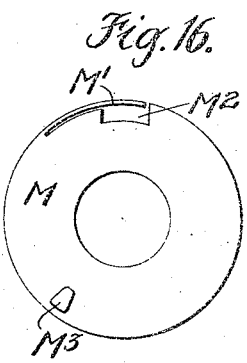
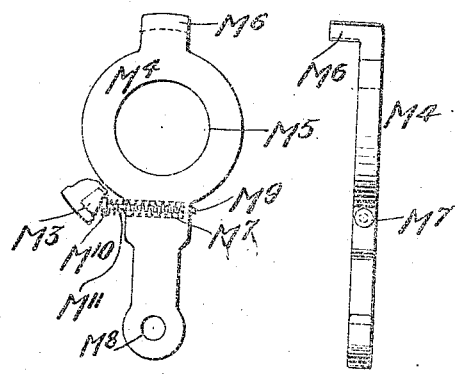
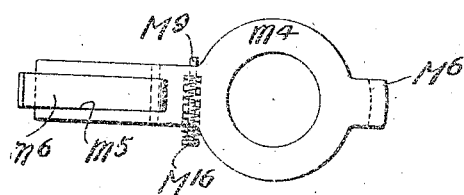
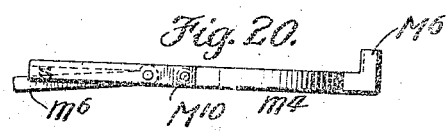
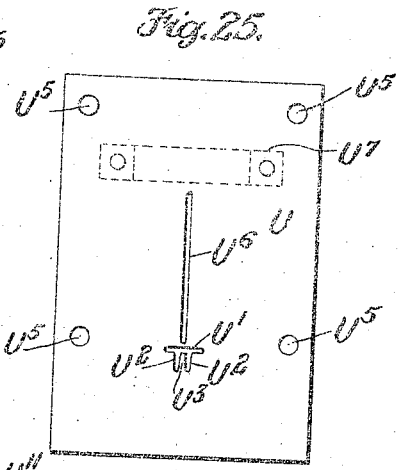
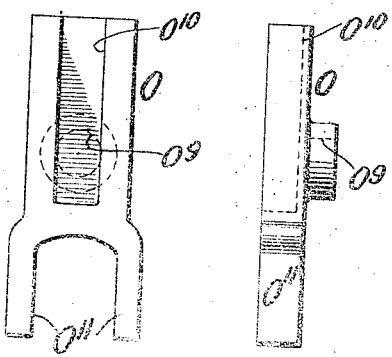
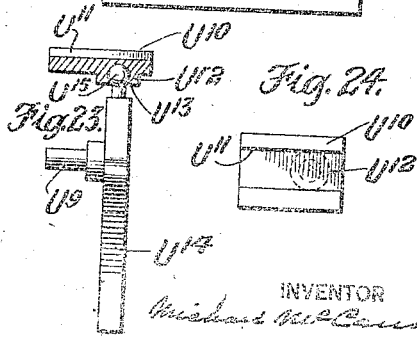

July 10, 1923.
M. McCANN
SEWING MACHINE
Filed Sept. 23, 1919
1,461,428
9 Sheets-Sheet 8
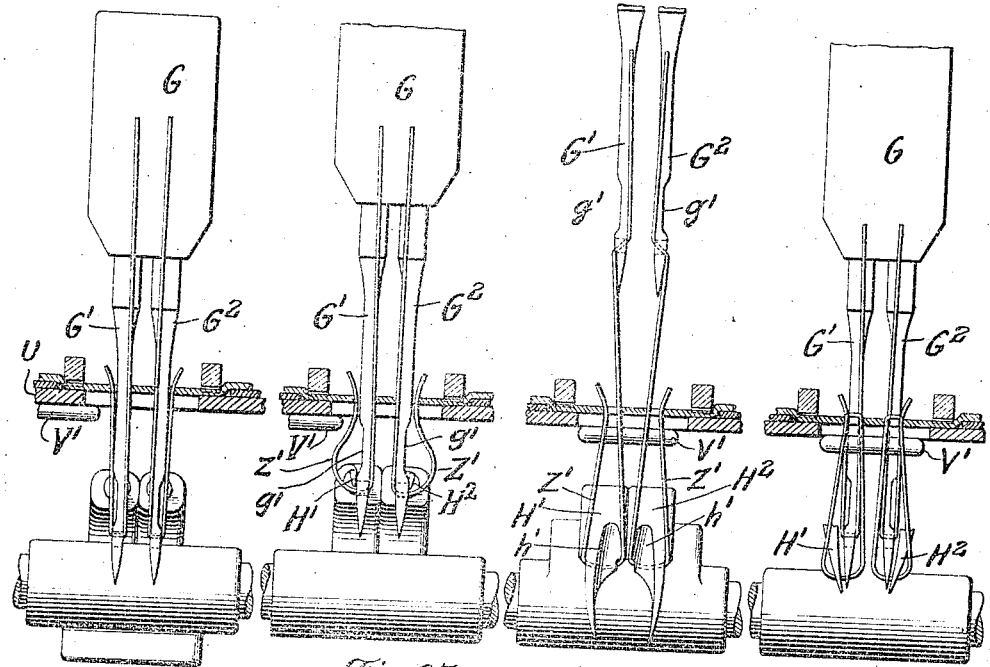
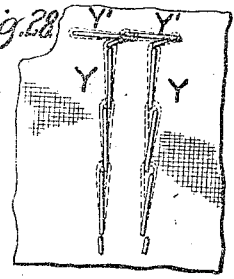
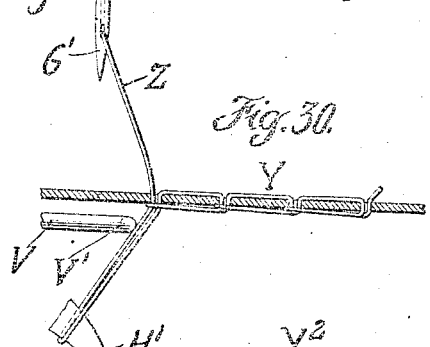
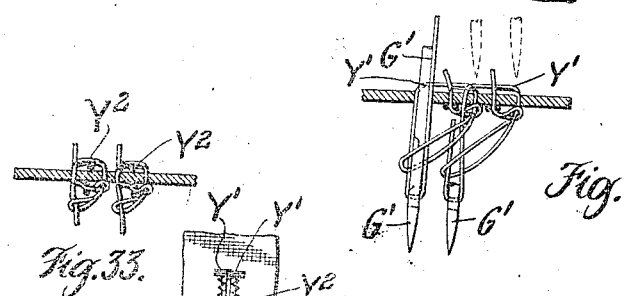
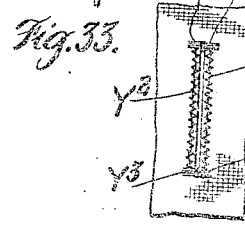
WITNESSES:
INVENTOR.
BY
ATTORNEY

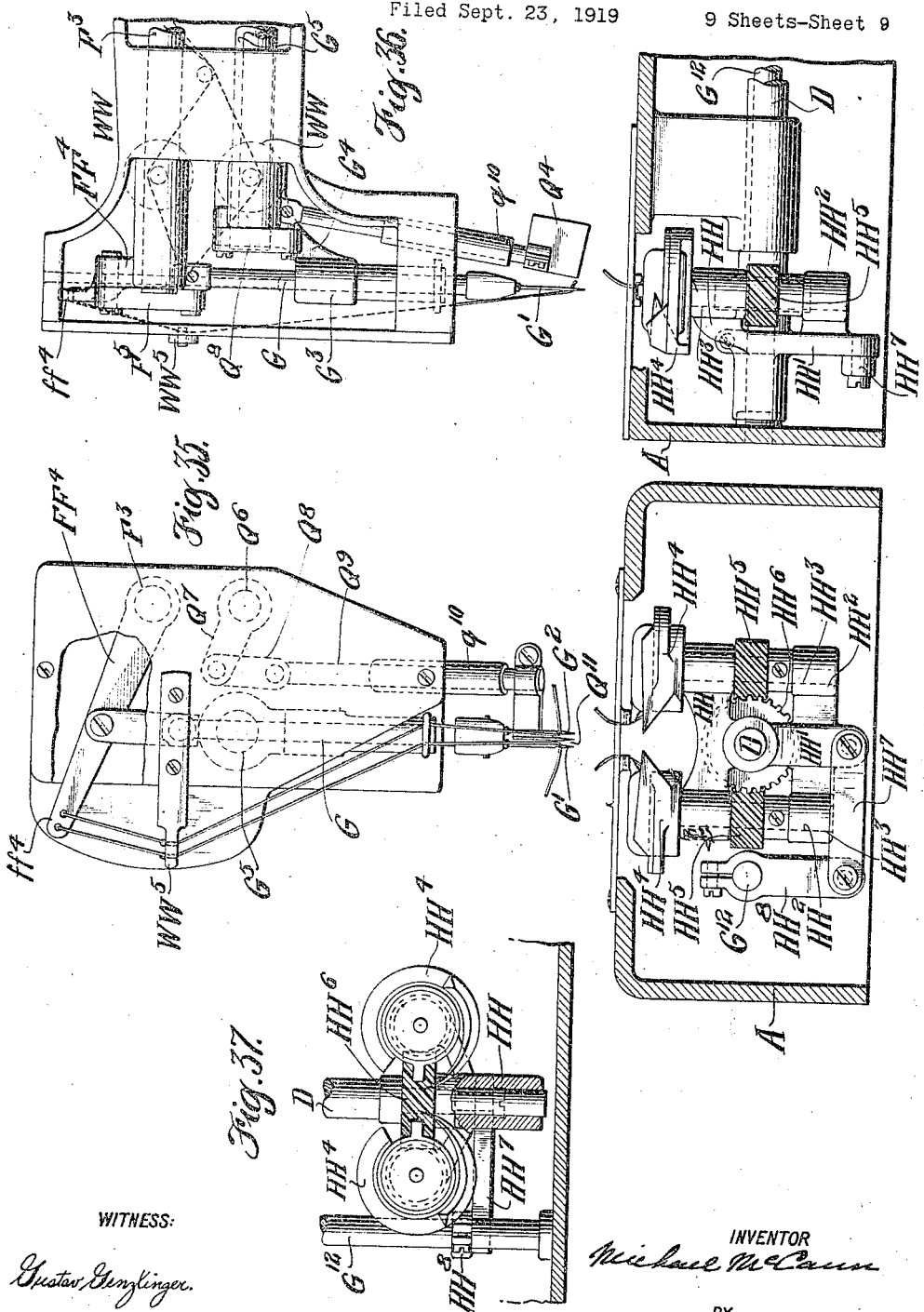

Patented July 10, 1923.

1,461,428

UNITED STATES PATENT OFFICE.

MICHAEL McCANN, OF GLENMORRIS, NEW YORK, ASSIGNOR TO FREDERICK OSANN COMPANY, OF NEW YORK, N. Y., A CORPORATION OF NEW YORK.

SEWING MACHINE.

Application filed September 23, 1919. Serial No. 325,710.

*To all whom it may concern:*

Be it known that I, MICHAEL McCANN, a citizen of the United States of America, residing in Glenmorris, L. I., in the county of Queens and State of New York, have invented certain new and useful Improvements in Sewing Machines, of which the following is a true and exact description, reference being had to the accompanying drawings, which form a part thereof.

My invention relates to sewing machines, and particularly to machines adapted to make a zig zag stitch, and my machine is especially designed to form button holes, though in its broader features my invention is capable of other useful applications. With reference to my machine as a whole, it is aligned to form a button hole having two rows of zig zag stitches simultaneously formed, and, preferably, formed over two parallel rows of padding stitches and to form a series of bar stitches at each end of the button hole, and in designing my machine I have had especially in view accuracy and rapidity of action and the formation of a button hole in less time than has heretofore been required for such work.

My machine is primarily intended to form a button hole the sides of which are formed of zig zag chain stitches, but it is capable, with slight modification, of forming the button hole with two thread lock stitches on each side.

My invention consists of various novel combinations of mechanism which will be best understood as described in connection with the drawings in which they are illustrated and which will be particularly pointed out in the claims.

In the drawings:

Figure 2 is a plan view on section line 2—2 of Fig. 1.

Figure 3 is a front elevation on line 3—3 of Fig. 1.

Figure 4 is an elevation on line 4—4 of Fig. 1.

Figure 5 is an elevation on line 5—5 of Fig. 1.

Figure 8 is a side view of the lever S partly cut away to show the stop disc behind it, the view being taken as on line 8—8 of Fig. 2.

Figure 10 is a sectional view taken as on line 10—10 of Fig. 11, showing the adjustable eccentric and cam $D^{16}$ on shaft D.

Figure 11 is a front view taken on line 11—11 of Fig. 10.

Figure 12 is a plan view on an enlarged scale, showing the cloth clamp and the slide to which it is attached.

Figure 13 is a side elevation of the parts shown in Fig. 12 of the head of the machine and of the cam $D^9$, $d^9$.

Figure 14 is a front view of the head.

Figure 16 is a front view of the clutch disc M.

Figure 17 is a front view of the clutch actuating lever $M^5$.

Figure 18 is a side view of the lever.

Figure 19 is a front view of the clutch lever $M^4$.

Figure 20 is a side view of the lever.

Figure 21 is a front view of the oscillating block O.

Figure 22 is a side view of block O.

Figure 23 is a detail showing on a larger scale some of the actuating mechanism for the loop engaging finger V'.

Figure 24 is a plan view of guide $U^{12}$.

Figure 25 is a plan view on a larger scale of the needle plate.

Figures 26 to 29 are a series of views showing the interoperation of the needles and hooks in forming the two rows of chain stitches.

Figure 30 is a view showing the operation of a needle and hook or looper in forming the padding stitches.

Figure 31 is a view of a piece of cloth in which has been formed one set of bar stitches and the two rows of padding stitches.

Figure 32 is a view showing the formation of the bar stitches.

Figure 33 is a view showing the formation of the zig zag stitches.

Figure 34 is a view of the completed buttonhole which my machine is designed to form.

Figure 35 is a front elevation with the front of the casing A cut away, showing a modified form of my invention in which two rotating hooks are employed instead of the oscillating hooks and a back stitch formed instead of a chain stitch.

Figure 36 is a side elevation of the device shown in Fig. 35, and

Figure 37 is a plan view of the rotating hooks and their immediate connections.

A is the casing enclosing and supporting the lower part of the machine, its top plate having formed in it the opening A' in which moves the slotted lever arm K and the clamp lifting pin $J^{12}$, the opening $A^2$ extending inward from the front of the machine and an opening $A^3$ lying within the upright standard C. B is the bottom plate hinged to casing A at B', B'. C is the vertical standard secured to the casing A and supporting the horizontal arm C' and head $C^2$. The parts B', B' and $B^2$ are open on one side and closed by a cover plate $C^3$ and the head is also open in front and closed by the cover plate $C^4$.

D is the driving shaft of the machine having at its end the fast and loose pulleys $D^2$, D'. The fast pulley $D^2$ is formed on or secured to a disc $D^3$ secured on shaft D in any convenient way and having a slot $D^4$ formed in its inner face with, preferably, a hard metal pin $D^5$ at its end. Consequently the inner face of disc $D^3$ is covered by a similarly slotted face plate $d^3$ which is replaceable when worn by the friction of the stop leg $S^3$ to be described.

Figure 6:
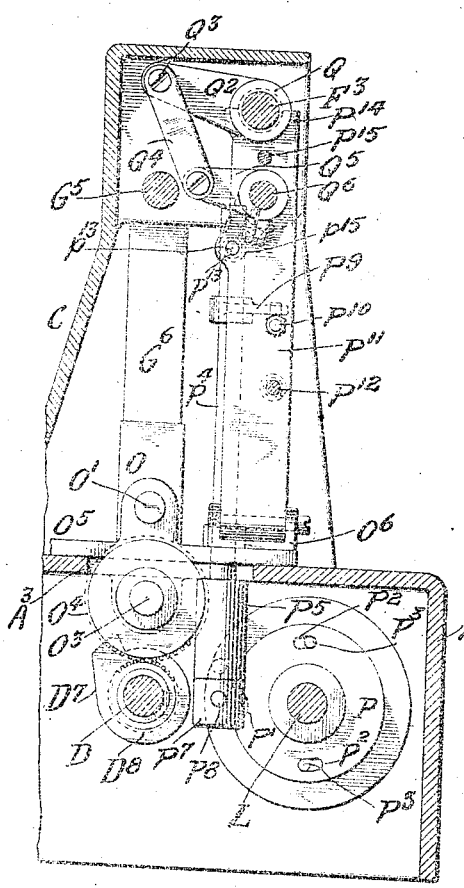
Figure 6 is an elevation on line 6—6 of Fig. 1.

$D^6$ is an eccentric secured on shaft D and actuating the eccentric ring F and rod F', which connects through lever $F^2$ with the rock shafts $F^3$, the lever $F^4$ at the end of which connects through link $F^5$ with the needle bar G, to the lower end of which are secured the two needles G' and $G^2$. The needle bar G is held in and guided by the guide $G^3$, which is formed on the end of the lever arm $G^4$ secured on the shaft $G^5$ to the other end of which is secured the lever arm $G^6$, see Figs. 6 and 7, which is formed with the slide block slot $G^7$, and below it with the curved end $G^8$, which connects through a pin and slide block indicated at $G^9$ with the slotted guideway $G^{10}$ of a lever $G^{11}$ secured to shaft $G^{12}$ which runs the length of the machine and has secured to its other end the upright lever $G^{13}$ connecting through a ball point $G^{14}$ with the transversely slidable shaft H to which are secured the two loopers H', $H^2$. The described connections between the needle bar guide and the looper shaft are such that the loopers are shifted from side to side as the needles are similarly shifted, so that they are always in position to properly engage the loops thrown off by the needles.

The proper engaging and disengaging motion is given to the loopers in the illustrated construction by oscillating the shaft H through the lever arm $H^3$ secured to its end and ball joint connected through link $H^4$ with the lever I, which is formed with an opening I' through which passes shaft D and oppositely extending lugs $I^2$ and $I^3$ above and below said opening. The lever I is pivoted on shaft $G^{12}$ and is actuated by the cams $D^{16}$ and $D^{17}$ secured on shaft D and acting against lugs $I^2$, $I^3$, the form of the cams being such as to actuate the loopers in proper timing and relation to the working strokes of the needle and so as to engage and disengage the loops at proper times.

Figure 1:
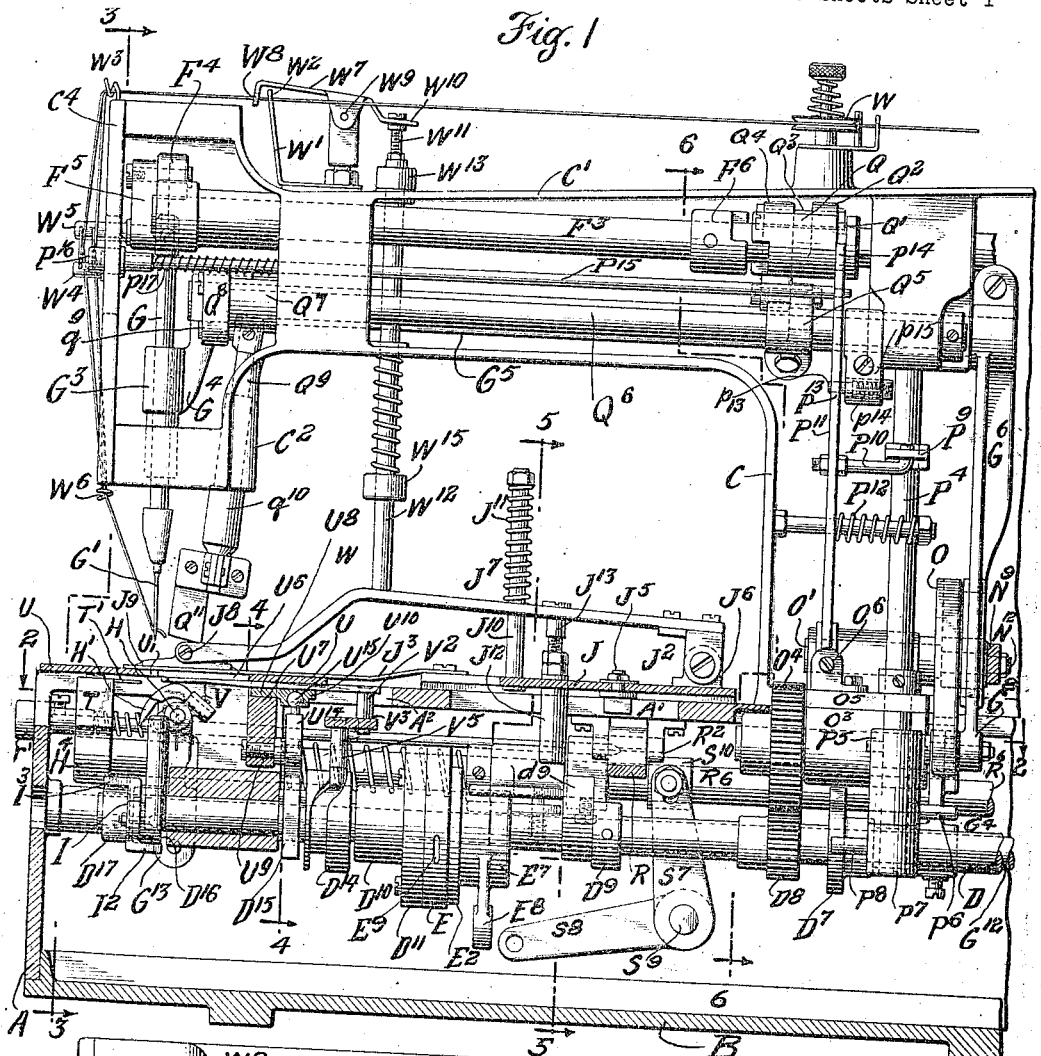
Figure 1 is a side elevation of my machine with the side plates of the upper arm and head removed and the side of the lower casing cut away.
Figure 15:
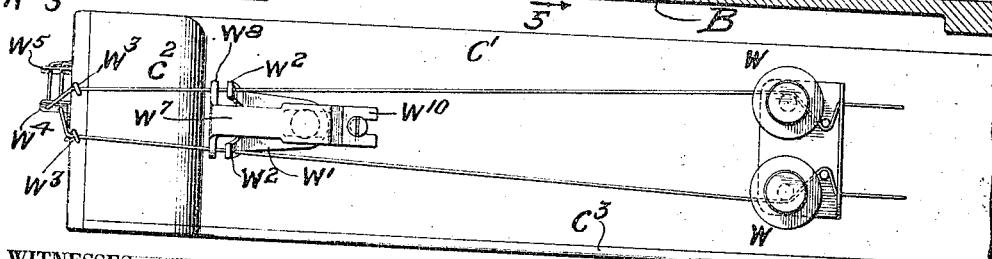
Figure 15 is a plan view of the head and the top of the horizontal arm.
Figure 7:
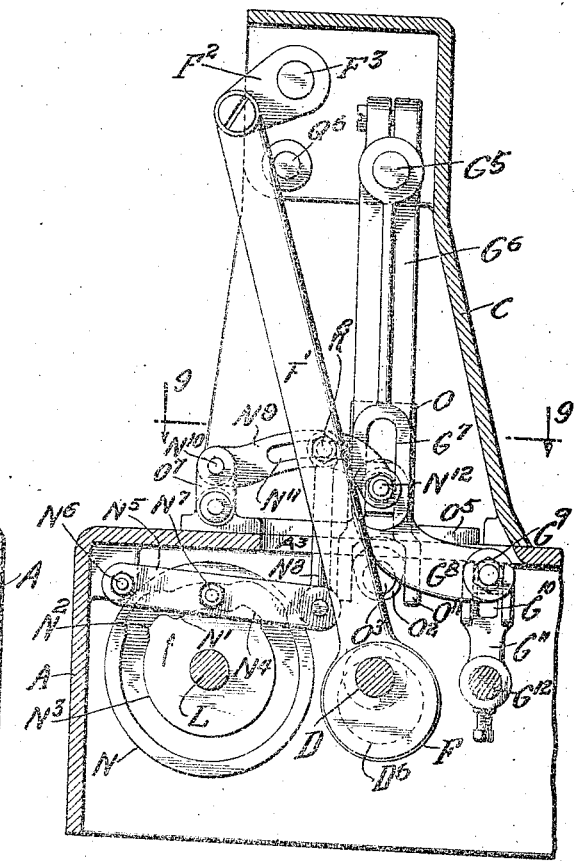
Figure 7 is an elevation on line 7—7 of Fig. 9.
Figure 9:
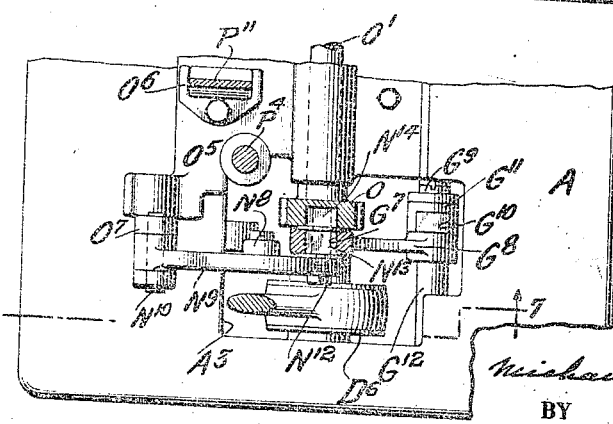
Figure 9 is a plan view taken as on line 9—9 of Fig. 7.

The movements of the needle bar guide and the corresponding movements of the looper shaft are caused by the cam $O^2$ on shaft $O^3$, which through the gear $O^4$ is actuated by gear $D^8$ on shaft D, so that shaft $O^3$ rotates once for each two rotations of shaft D. The cam $O^2$ operates between and upon the forked lower end $O^{11}$ of a block O as shown in Figs. 7 and 21; said block is pivotally supported by a laterally extending pin O' in a frame bearing as shown in Fig. 1, and has a slide block bearing $O^{10}$, Fig. 21, formed in its upper portion corresponding to the similar bearing $G^7$ in lever $G^6$. See Figs. 7 and 9. Slide blocks $N^{13}$ and $N^{14}$ are located in the bearings in block O and lever $G^6$ and are pivotally secured on a pin $N^{12}$ extending out from the end of a lever $N^9$, pivoted at $N^{10}$ on a link $O^7$, the lower end of which is pivotally attached to a plate $O^5$ secured on the top of casing A. The lever $N^9$ is formed with a slot $N^{11}$ in which is adjustably secured the pivot pin $n^8$ on which is pivotally secured the link $N^8$ connected at its lower end to the cam actuated lever $N^5$ pivoted on stud $N^6$, and having a cam roller $N^7$ connected to it, which is acted upon by the cam N secured on shaft L. The relative positions of the cam N and cam roller $N^7$ at the beginning of a button hole forming operation is approximately, as shown in Fig. 7, the roller riding on a circular portion N' of the cam of such radius that, acting through lever $N^5$, link $N^8$ and lever $N^9$, it holds the slide block pin $N^{12}$ in a position in which it is concentric with the pivot O' of block O, and hence no oscillating movement is imparted to lever $G^6$. At the starting of the machine the feeding mechanism, to be described, moves the cloth quite rapidly beneath the needles and while the portion N' of the cam is operative and the needles in a position midway between the extreme transverse travel, the long padding stitches Y, see Figs. 30 and 31, are formed on each side of the center of the button hole to be formed. The cam N, turning in the direction of the arrow in Fig. 7, next brings the elevated portion $N^2$ of the cam path into operation, raising the slide blocks $N^{13}$ and $N^{14}$ to their highest positions in block O and lever $G^6$, causing the needles and loopers to move from side to side to form a series of bar stitches, as shown at $Y'$, Fig. 31, and during the formation of these stitches the feed mechanism holds the cloth stationary. The cam roller $N^7$ next comes in contact with the portion $N^3$ of the cam path, which is circular in form, from $N^2$ to $N^4$, and of such distance from the center of the cam that through the connections described the needles are oscillated, one on each side of the center line of the button hole, to form the two series of zig zag stitches shown at $Y^2$, Fig. 34, these stitches passing over the padding stitches Y, and, of course, the feed moving the goods beneath the needles while they are forming the stitches $Y^2$. The elevated cam path $N^4$ next coming into operation, the portion of the cam corresponding in height to the portion $N^2$, and the feed being stationary, the bar stitches shown at $Y^3$, Fig. 34, are formed at the end of the button hole. After the cam roller $N^7$ drops from $N^4$ on to $N'$, and before the feed begins to move the cloth a series of knot stitches are formed before the machine stops and the thread is cut preparatory to the removal of the completed button hole.

It will, of course, be obvious that barring stitches may first be formed at one end of the button hole, then padding stitches followed by barring stitches at the other end of the button hole and that the two rows of zig zag stitches will in such case form the last element of the button hole. Such a change in the order of the stitching involves no change in the form of the controlling cams.

Referring next to the feed mechanism and parts immediately associated with it, U is the needle plate, best shown in Figs. 4 and 25, secured to the top of casing A over the end of opening $A^2$ as by screws passing through the screw holes $U^5$; it is formed with a transverse opening $U'$ through which the needles pass and from this opening extend forwardly the slots $U^2$, $U^2$, separated by a tongue $U^3$. These slots are for the purpose of permitting the thread to move forward to the necessary extent in forming the long padding stitches Y. The plate U has a downwardly extending bracket $U^7$ secured to it in which is formed a slotted bearing $U^8$ for a slide block $U^{10}$, and to which is secured a pivot pin $U^9$. The purpose of this bracket, and parts working with it, will be hereafter described. J is a sliding plate having flanges $J'$, $J'$ moving in guideways formed on the casing A, $J^2$ being a slot extending across the plate. $J^3$ is the cloth plate secured to plate J and having the opening $J^4$ formed in its end with serrated edges as indicated. $J^5$, Fig. 5 is a slide block pivotally supported on a pin secured to the plate J and adjustable in slot $J^2$. $J^6$ is a hinge connection at the rear end of plate J to which is hinged the clamping lever $J^7$ having pivotally connected to its outer end at $J^8$ the clamp $J^9$ fitting in slot $J^4$ and having serrated edges, as shown. A pin $J^{10}$ extends from plate J through lever $J^7$, and a spring $J^{11}$ presses lever $J^7$ downward. As a means of lifting lever $J^7$ a downwardly extending pin $J^{12}$ is provided, adjustably connected to the lever by a screw clamp $J^{13}$, the lower end of the pin $J^{12}$ being acted on by a cam to be described. The pivoted slide block $J^5$ enters and moves in the slotted guideway of a lever K, pivoted to the frame at $K'$, and having a cam engaging pin and roller $K^2$ extending down from it into the cam groove of cam $L'$, which is fixed on shaft L and has its cam groove formed to give to lever K, and through it to plate J and its attachments, the described feed movements. Thus, as shown in Fig. 2, the parts are shown in position to begin the button hole and the sharply inclined portion $L^2$ of the cam acting on cam roller $K^2$ moves the slide plate J and the cloth clamping device attached to it rapidly forward, while the padding stitches Y are being made. The straight portion $L^3$ of the cam next comes into operation, holding the feeding mechanism stationary, while the bar stitches $Y'$ are formed. Then the long inclined cam portion $L^4$ comes into operation while the zig zag stitches $Y^2$ are being made, and finally the straight portion $L^5$ holds the cloth stationary while the barring stitches $Y^3$ are formed and the knot stitches made to finish the button hole. The cam $L'$ is also provided with a finger $L^7$, Fig. 5, on its outer face, which sets in operation the stop mechanism to be described. The sides of cam $L'$ are formed with outwardly extending annular rims $L^6$ which are engaged by clutches, adapted to impart to cam $L'$ and shaft L a step by step rotary movement and which, as shown, in detail in Figs. 16 to 20, consist of discs M having tongues $M'$ formed at their edges, the free ends of the tongues extending over rectangular openings $M^2$. Each disc has also a spring abutment $M^3$ on its face. Engaged with the disc M on the left hand side of the cam $L'$, see Fig. 2, is a cam actuating finger $M^4$ having an opening $M^5$ formed in it to surround, but clear, shaft L, and a turned in end $M^6$ engaged in opening $M^2$. $M^7$ is a hole formed in finger $M^4$ for a pin $M^9$, having a head $M^{10}$, which abuts against stop $M^3$, and $M^{11}$ is a spring acting to turn the finger so that its end $M^6$ will press the clutch tongue $M'$ out against the rim $L^6$, and thus couple the disc M and cam together. $M^8$ is a pin in the end of finger $M^4$ by which it is connected to the eccentric rod $E^8$, see Figs. 4, 10 and 11, the eccentric strap $E^7$ of which engages the eccentric $E^6$ which is internally slotted as shown at $E^5$, to permit its adjustment on shaft D, to which it is operatively secured, as shown in Figs. 10 and 11, the eccentric being formed with a flange which rests against the face of a disc E journalled on a projection $D^{13}$ of a hub $D^{10}$ secured to shaft D and having an annular flange $D^{11}$ against which disc E abuts and in which are formed radial slots $D^{12}$, $D^{12}$. The disc E is formed with cam slots $E'$, $E'$, into which extend pins $E^3$ screwed into flange $E^4$, and extending, as shown, into slots $D^{12}$. It will readily be seen that the throw of the eccentric can be changed by turning the disc E, and a key slot $E^9$ is formed in it for convenience in so adjusting it. While the clutch M is making its reverse stroke the cam $L'$ is held stationary by the similar clutch disc working in the annular rim $L^6$ on the right hand side of cam $L'$ and actuated by the finger $m^4$, which is similar in form and attachment to finger $M^4$ except that its end is slotted as shown at $m^5$, and has attached to it the pivoted latch $m^6$, which projects with the end of the finger through a slot in casing A and is normally latched in position, but which by retracting the latch can be used to turn the cam $L'$ by hand and thus adjust the cam, and parts operated by it, to any desired position.

To insure the loops being in proper position to be engaged by the needles in their downward stroke I provide my machine with a thread engaging finger $V'$. This finger is formed by a laterally extending end of the slide V, movable in the guideway $U^{11}$ of slide block $U^{10}$, which, as already described, rests in the slot $U^8$ of the bracket $U^7$, and slide V is, see Fig. 2, pivotally attached at its rear end at $V^2$ to the lever $V^3$ pivoted at $V^4$, and having extending down from it the cam engaging pin $V^5$, see Fig. 1, which enters the cam groove of the cam indicated at $D^{14}$, said cam groove being so formed as to thrust the lever and the finger forward at a proper time to engage the thread loops and push and hold them in the proper needle engaging position and afterward to retract, after the finger has been moved laterally to disengage it from the threads. The lateral movement is given to the finger $V'$ by the pivoted lever $U^{14}$, see Fig. 4, engaged by the slide block $U^{10}$ and actuated by the cam $D^{15}$.

At the completion of the operation of the machine in forming a button hole the machine comes to an automatic stop and just before the motion of the machine is arrested I provide mechanism for cutting the cloth between the lines of stitches, for pulling through the tensions a certain length of thread to facilitate the formation of the first stitches on a new button hole and for cutting the thread between the needle and the completed button hole, and I also provide for the automatic lifting of the clamp holding the cloth against the needle plate. The mechanism for accomplishing all these purposes is intimately associated with the stop mechanism. Referring first to the mechanism for cutting the cloth between the rows of stitches, $F^6$ is a clutch member secured upon the oscillating shaft $F^3$ and in position to be engaged by a sliding clutch member Q, which slides on this shaft, and is formed with a groove $Q'$, which is engaged by the upper end $P^{14}$ of a lever $P^{11}$ pivotally supported on the plate $O^5$ and $O^6$ and under pressure of a spring $P^{12}$, which tends to press it and the clutch Q in the engaging position. The lever $P^{11}$ is formed with a perforation at $P^{13}$, which, when the lever is in retracted position, engages a pin $p^{13}$, retractively held projecting from a lever arm $p^{15}$ attached to the shaft $Q^6$, by a spring as indicated at $p^{14}$. This engagement prevents any movement of the shaft $Q^6$ while the lever $P^{11}$ is in retracted position. $P^{10}$ is a rod projecting backward from the lever $P^{11}$, and pivotally engaged at its far end with the lever $P^9$ extending out from the shaft $P^4$, which is rotatively held in bearings on the frame of the machine and has secured to its lower end the adjustable collars $P^5$ and $P^7$ from which project in opposite directions the cam engaging pins $P^6$ and $P^8$. The pin $P^6$ lies in contact with the cam P having the depressed portion $P'$, the cam disc being formed with circumferential slots $P^2$, $P^2$, the purpose of which will be hereafter described, and being permanently attached to the shaft L. The action of the spring $P^{12}$ holds the finger $P^6$ in contact with the cam P and permits the movement of the lever $P^{11}$ in a direction to engage the clutch Q when the pin moves into the recess $P'$. In order to retract the lever $P^{11}$ and the clutch Q from clutch engaging position with great rapidity I provide a cam $D^7$ on the shaft D which engages the pin $P^8$ and rapidly rotates the shaft P to its normal stationary position, and consequently, rapidly disengages the clutch Q. The clutch Q has extending from it the lever arm $Q^2$, pivotally connected at $Q^3$, with the link $Q^4$, which is also pivotally engaged with the end of the lever $Q^5$ attached to the shaft $Q^6$, and to the front end of the shaft $Q^6$ is attached the lever $Q^7$ connected by a link $Q^8$ with a knife carrying slide rod $Q^9$, which is guided in bearings $q^{10}$ in the head of the machine, and has attached to its lower end the knife $Q^{11}$, and it will be observed that the bearings for the knife carrying rod $Q^9$ are inclined forward so that the knife can be made to cut close to the needles.

In order to prevent the knife from being actuated when it is desired that it should not act I provide a rod $P^{15}$ the inner end of which rests against the lever $P^{11}$, and the outer end of which has a push button $P^{16}$ extending from the face plate $C^4$, as shown, a spring $P^{17}$ keeping the push button in normal outward position.

The cutting of the thread, and the stopping of the machine immediately after the thread is cut is brought about by the projection $L^7$ of the cam $L'$ acting against the contact surface $R'$ of the bent lever R, which is pivoted at $R^2$, normally held in engaged position by the action of the spring $R^4$ and has an edge $R^3$ which normally engages the collar $R^5$ on the shaft $R^6$, which is longitudinally slidable in its bearings in the frame of the machine and is thrust backward by the action of a spring $R^7$. The longitudinal movement of the shaft $R^6$ is limited by the buffer stops indicated at $S^6$ and $S^5$, and in the rear end of the shaft is secured the lever S having a belt shifter $S^2$ secured to its end $S'$, and a brake stop $S^3$ projecting outwardly from the face of the lever in position, when the shaft $R^6$ moves backward to rest against the face of the disc $D^3$ and to enter slot $D^4$, and finally to come in contact with the stop pin $D^5$. $S^4$ indicates the belt which is shifted from its position on the fast pulley to a position on the loose pulley by the movement of shaft $R^6$. The shaft $R^6$ is retracted and the machine restored to starting position by the bell-crank-lever $S^7$, $S^8$, pivoted at $S^9$ and pivotally engaged with the collar $S^{10}$ on the shaft $R^6$, as is shown best in Figs. 1 and 2.

I provide for raising the end $R^3$ of the lever R and stopping the machine at will by means of a rod $r$ having a push button $r'$ at its outer end, with a taper point extending beneath the lever arm $R^3$, as shown in Figs. 2 and 5.

The longitudinally movable shaft $R^6$ has secured to its front end the knife carrying bar T, carrying the preferably angular knife $T'$, which severs the threads below the needle plate just before the motion of the machine is arrested. Secured to the shaft $R^6$ is the collar $R^8$, which serves as an abutment for the spring $R^7$ and from which extends the plate $R^9$, a portion of which extends below the lever $R^{11}$, which is pivoted on the shaft $R^6$ and which is normally held in position, as shown in Fig. 5, by resting against the adjustable stop $R^{10}$ against which it is drawn down by the action of a spring indicated at $R^{12}$. When the shaft $R^6$ is permitted to move longitudinally by the withdrawal of the lever arm $R^3$ the lever arm $R^{11}$ moves with it, first to a position in which it lies against the face of the cam $D^9$, and then as this cam, which is secured on the shaft D by its hub $d^9$, rotates until its lower portion comes beneath the lever $R^{11}$ said lever $R^{11}$ moves further on to the top of the cam permitting the full longitudinal motion of the shaft $R^6$, and, as the cam $D^9$ rotates the lever $R^{11}$ is lifted and its outer end $R^{13}$ comes in contact with the pin $J^{12}$ and through it lifts the clamp lever $J^7$ from the position shown in Fig. 1 to the elevated position shown in Fig. 13, and this motion of the clamp lever $J^7$ acting against the pin $W^{12}$, held in its downward position by the action of a spring pressing on the collar $W^{15}$ which holds the stop $W^{13}$ in contact with the top of the machine, pushes up the rear end of the lever $W^7$ adjustably secured to the rod $W^{12}$, as indicated at $W^{11}$, and pivoted at $W^9$, so that its active end $W^8$ takes up the desired amount of thread to be held in reserve for restarting the machine, as indicated in Fig. 13.

Tension devices of a well known character are indicated at W, W, and thread guides are indicated at $W^2$, $W^3$, $W^4$, $W^5$ and $W^6$.

It will be observed that the needles $G'$ and $G^2$ are cut away as indicated at $g'$ to give free passage to the ends of the loopers, and that the loopers $H'$ and $H^2$ are slotted on top as indicated at $h'$ to give free passage to the needles.

My machine as illustrated is especially designed to embody two needles and two co-operating loopers and give to the needles and the loopers at proper times a transversely reciprocating movement so as to form two lines of zig zag stitches on either side of a button hole, as illustrated in Fig. 34. The machine is also designed to form in the cloth, at the beginning of its operation, two lines of padding stitches over which the zig zag stitches extend, and to form a bar at each end of the button hole. The way in, which the illustrated and described mechanism operates to produce this result has been, to a large extent, indicated in the foregoing description of the drawings, but I will now further describe the operation of the machine.

When the machine comes to a stop the clamping lever $J^7$ is in elevated position, as shown in Fig. 13, the threads have been cut below the needle plate and the thread pulling lever $W^7$ has drawn the proper length of thread through the tensions as also indicated in Fig. 13. The cloth is then shifted or replaced between the cloth plate $J^3$ and the clamp $J^9$ and the lever $S^7$, $S^8$, is drawn down, shifting the shaft $R^6$, longitudinally retracting the lever S and the stop $S^3$ and drawing the belt $S^4$ on to the fast pulley. The movement of the shaft $R^6$ also shifts the lever $R^{11}$ so that it passes from above the cam $D^9$ and is drawn down by the spring $R^{12}$ to the position shown in Fig. 5 and out of contact with the pin $J^{12}$, which holds the clamping lever $J^7$ in elevated position, so that the spring $J^{11}$ will force the clamping lever down on to the goods. The downward motion of the lever $J^7$ permits the spring $W^{10}$ to force the pin $W^{12}$ downward, restoring the thread pulling lever $W^7$ to the position shown in Fig. 1. The shifting of the shaft $R^6$ also involves the shifting of the arm T and the thread cutter $T'$, so that the cutter is removed from the operative path of the needle. The shifting of the shaft $R^6$ also permits the lever R, under the influence of the spring $R^4$, to move down so that its edge, indicated at $R^3$, engages the lug $R^5$ on the shaft $R^6$ and locks it in retracted position. The starting of the machine by the action of the belt on the fast pulley of course sets in operation the mechanism for reciprocating the needles and oscillating the loopers, and at the starting of the machine the cam N is approximately in the position shown in Fig. 7, and the cam $L'$, which is secured to the same shaft L as is the cam N, is approximately in the position shown in Fig. 2. At the starting of the machine, therefore, the sharply inclined portion $L^2$ of the cam $L'$ acts upon the curved lever K moving it quite rapidly to the left, as shown in Fig. 2, and this movement acting through the slide block $J^5$ moves the plate J and the cloth plate $J^3$ and clamp $J^9$ forward, so that the cloth is made to pass beneath the needles for a distance equal to the length of the button hole to be formed. When the cloth is being moved beneath the needles, as described, the needles and loopers are positioned by the left hand portion $N'$ of the cam groove of the cam N, the position being such that the needles and loopers are in central position and are held against lateral oscillation so that they form the series of padding stitches indicated at Y, Y, in Fig. 31. The connection between the cam N and the mechanism for shifting or guiding the paths of the needles and loopers consists of the lever $N^5$ connected by a pin and cam roller indicated at $N^7$ with the cam N and connected through the link $N^8$ with the lever $N^9$, which lever, through its slide block pin $N^{12}$, connects with the two slide blocks $N^{13}$ and $N^{14}$, the block $N^{14}$ moving in the slot $O^{10}$ of the block O, oscillatable on its pivot pin $O'$, and having the forked cam engaging end $O^{11}$ at its other end, while the slide block $N^{13}$ moves in the groove $G^7$ of the lever $G^6$, which lever is secured to the shaft $G^5$ as is also the needle bar guide indicated at G, and it will be observed that in the starting position of the machine, and while the padding stitches are being made, the pivot $N^{12}$ for the slide blocks lies concentric with the pivot $O'$ so that no reciprocating motion is imparted to the needle bar guide. The block O is constantly reciprocated on its pivot $O'$ by the action of the cam $O^2$ on the shaft $O^3$, and this shaft, through the gears $O^4$ and $D^5$, is rotated at half the speed of the shaft D. The curved end $G^8$ of the lever $G^6$ is connected through the lever $G^{11}$ to the shaft $G^{12}$ and this shaft is in turn connected through the lever arm $G^{13}$ with the sliding shaft H to which the loopers $H'$ and $H^2$ are attached, so that any movement given to the needle bar guide $G^3$ will result in a corresponding movement being given to the sliding shaft H, so that the loopers will always be in position to coact with the needles in whatever position they may be shifted. The necessary reciprocation is given to the loopers by the oscillation of the shaft H imparted to it through the link $H^4$ and the lever I by the cams $D^{16}$ and $D^{17}$ on the shaft D.

Returning to the cams N and $L'$ on the shaft L it will be observed that when the cam roller $N^7$ rises on the elevated portion $N^2$ of the cam path the lever $N^8$ and the slide blocks supported on its pin $N^{12}$ will be moved up in the slots $G^7$ and $O^{10}$ to their highest positions. The result of this is that the oscillation of the block O will now impart an oscillation to the lever $G^6$, and through it to the shafts $G^5$ and $G^{12}$, with the result that the needle bar guide $G^3$ and the looper shaft H will be moved from side to side so as to form a series of stitches such as are indicated at $Y'$, Fig. 31, forming a bar at the end of the button hole. While these stitches are being formed the cam roller $K^2$ of the slide lever K is in contact with a straight portion $L^3$ of the cam $L'$, so that the cloth plate and clamp are held stationary until the desired number of barring stitches have been made. The cam roller $N^7$ next moves on to the portion $N^3$ of the cam N, with the result that the slide block pin $N^{12}$ is moved down toward but not into a concentric position with the pivot $O'$ of the block O, and so that the needle bar guide and looper shaft are still reciprocated, but to a less extent, than in the forming of the bar stitches, and during this portion of the operation the zig zag stitches indicated at $Y^2$, $Y^2$ in Fig. 34 are formed, and while these stitches are being formed the cam roller $K^2$ of the lever K is in contact with the long inclined portion $L^4$ of the cam $L'$, so that the work holding plate and clamp and the cloth held between them is moved gradually backward with the result of forming the two lines of zig zag stitches. The next portion of the cam N to come into operation is its elevated portion $N^4$, which, through the mechanism already described, results in giving again a maximum movement to the needle bar guide and looper shaft so as to form the bar stitches indicated at $Y^2$ in Fig. 34, and while these stitches are being formed the cam roller $K^2$ of the lever K is in contact with a straight portion $L^5$ of the cam $L'$ so that no feeding of the cloth occurs. While the goods are still held stationary by a prolongation of the cam surface $L^5$ the cam roller $N^7$ passes down from the cam portion $N^4$ on to the right hand side portion of the cam portion $N'$, with the result that a series of knot stitches are taken before the machine stops.

The motion given to the shaft L and to the cams $L'$ and N is imparted from the shaft D and by the eccentric $E^6$ adjustably secured on said shaft as described in connection with Figs. 10 and 11, the eccentric rod $E^8$ connecting with the end $M^3$ of the finger $M^4$, the bent end $M^6$ of which enters the slot $M^2$ of the clutch M, which clutch engages the annular flange $L^6$ of the cam $L'$ and gives to the cam and to the shaft L a step by step motion, the shaft being held from any backward motion by the similar clutch working in the annular frame on its opposite side and actuated by the finger $m^4$, and, as I have already pointed out, this finger $m^4$ and the clutch disc connected to it can be used for adjusting the cams $L'$ and N if any necessity for adjustment occurs.

To refer next to the operation of the finger $V'$, the function of this finger is to move forward against the threads of the loop as the needle is retracted from the cloth and push and hold the loop threads in such position that when the needle makes its next working stroke it will pass through the loop. While the padding stitches are being made the movement of the goods between the stitches draws and holds the loops into proper position to be engaged by the needles as shown in Fig. 30, and the finger $V'$ performs no useful function, but when the zig zag stitches are being formed and the goods move in the opposite direction, the movement of the goods between stitches tends to draw the loops out of the path of the needles and the finger $V'$ then functions as above explained. After the needles have engaged the loops the finger must then be retracted to engage with the next succeeding loop threads, and in order to retract it, it is necessary that it should move out before it moves backwards. The backward and forward reciprocating movement is imparted to the finger $V'$ by the cam $D^{14}$ acting through the cam engaging pin $V^5$ on the lever $V^3$, pivoted at $V^4$, and pivotally connected at $V^2$ with the slide V, on the end of which the finger $V'$ is formed. Sidewise movement is imparted to the slide V and finger $V'$ by the cam $D^{15}$ on shaft D acting on the yoke at the end of the lever $U^{14}$, the upper end of which is connected with the slide block $U^{19}$ supported in the bracket $U^7$ and in which the slide V reciprocates.

The button hole having been completed by the mechanism described, the cam P next comes into operation, this cam being secured on the shaft L, and when, on the rotation of this shaft, its depressed portion $P'$ registers with the pin $P^6$, secured to the shaft $P^4$, the shaft $P^4$ is permitted to turn, in turn permitting the lever $P^{11}$ connected with it by the pin $P^{10}$ to move under the pressure of the spring $P^{12}$ and to move the clutch member Q in the direction to engage the clutch member $F^6$ on the shaft $F^3$. The motion of the lever $P^{11}$ disengages it from the pin $P^{13}$, secured to the shaft $Q^6$, and clutch member Q, now engaged with the shaft $F^3$, is rotated by said shaft and, through its lever arm $Q^2$, link $Q^4$, and lever arm $Q^5$, it gives a sharp rocking motion to the shaft $Q^6$, which, through the link $Q^8$ and knife $Q^9$, causes the knife $Q^{11}$ to move sharply downward and cut the cloth between the zig zag lines of stitches and then to be retracted to its uppermost position where it comes to rest and is locked in position by the engagement of the pin $P^{13}$ to the lever $P^{11}$. The shaft $P^4$ and lever $P^{11}$ are sharply returned to their normal position, as shown in Fig. 1, by the action of the cam $D^7$ on the shaft D coming in contact with the pin $P^3$.

Immediately following the cutting of the cloth between the lines of stitches the projection $L^7$ on the cam $L'$ comes in contact with the adjustable finger $R'$ on the lever R, with the result that the arm $R^3$ of this lever is lifted so as to release the lug $R^5$ and permit the spring $R^7$ to shift the shaft $R^6$ to the right, as shown in Fig. 2, this shifting motion of the shaft bringing the lever $R^{11}$ in contact with the side of the cam $D^9$, as shown in Fig. 5, and as the cam $D^9$ revolves until its lower part comes into registry with the lever $R^{11}$ said lever and the shaft $R^6$ is then permitted to move still further to the right until the lever $R^{11}$ is in registry with the cam $D^9$ and the stop $S^3$ in contact with the disc $D^3$. The cam $D^9$ lifts the lever $R^{11}$ so that its end $R^{13}$ lifts the pin $J^{12}$, and through it the clamping lever $J^7$ and clamp $J^9$ to the position shown in Fig. 13, the upward motion of the clamping lever $J^7$ lifting the pin $W^{12}$ and actuating the thread pulling lever $W^7$, as shown in Fig. 13. Then as the machine continues in operation the stop finger $S^3$ enters the slotted portion $D^4$ of the disc $D^3$ and finally brings up against the stop pin $D^5$, arresting the motion of the machine. As the stop $S^3$ moves from its position in contact with the disc $D^3$ into the recess $D^4$ the motion of the shaft $R^6$ moves the lever T and the triangular knife $T'$ inward so that the edges of the knife come in contact with the outer threads of the loops and sever them just before the motion of the machine is arrested.

As heretofore described my machine is organized to make what is known as a chain stitch, but my invention, in its broader sense, includes such modifications as are necessary if it is desired to form lock stitches instead of chain stitches, and in Figs. 35, 36 and 37 I have shown how my machine can be readily and simply modified to form lock stitches. In these figures H, H, is a frame pivotally supported on shaft D and having a lever arm H, H' secured to it, as shown. The frame has spaced bearings H, H² for the spindles H, H³, to the tops of which are secured the rotating hooks H, H⁴, which are of usual and well known construction. On each spindle is secured a spiral gear H, H⁵ engaged to a spiral gear H, H⁶, secured to shaft D. The lever H, H¹, is connected by a link H, H⁷ to a lever H, H⁸, secured to rock shaft G¹². It will be obvious that by the device described the hook can be rotated in properly timed relation to the movements of the needles and that the frame and hooks supported by it will be oscillated in proper relation to the movements of the needles as in the previously described construction.

The use of the rotating hooks of course require a greater take up of the threads, and I provide for this by using an arm F, F⁴, in place of arm F⁴, which is prolonged as shown at $f$ $f^4$ and perforated for the passage of the threads, and I provide also a guide as shown at W, W⁵ between the arm and the needle.

The button hole cutter mechanism shown and described involves novel features invented by me and claimed in my pending application for Letters Patent, Serial No. 566,784, filed June 8, 1922. The pull off actuating mechanism described is also, I believe, novel with me and forms the subject matter of claims in my application, Serial No. 579,794, filed August 5, 1922. Again the button hole described and the method of making it are also, I believe, novel with me and forms the subject matter of my application, Serial No. 559,572, filed May 9, 1922. The friction clutch described is also novel and forms the subject matter of my application, Serial No. 572,136, filed July 1, 1922.

Having now described my invention, what I claim as new and desire to secure by Letters Patent, is:

1. In a sewing machine having a laterally movable needle bar and coacting stitch forming mechanism, the combination therewith of cam controlled mechanism for regulating the lateral movements of the stitch-forming mechanism so that it will in connection with the cloth feeding mechanism periodically form stitches in an intermediate straight line and in zig zag lines, a cloth clamp and cam controlled mechanism for moving said cloth clamp in one direction while the stitch forming devices are in position to form a straight line of stitches and in a reverse direction while the stitch forming devices are in position to form zig zag stitches.

2. In a sewing machine having a laterally movable needle bar and coacting stitch forming mechanism, the combination therewith of cam controlled mechanism for regulating the lateral movements of the stitch forming mechanism so that it will in connection with the cloth feeding mechanism periodically form stitches in an intermediate straight line and in zig zag lines, a cloth clamp and cam controlled mechanism for moving said cloth clamp in one direction while the stitch forming devices are in position to form a straight line of stitches and in a reverse direction while the stitch forming devices are in position to form zig zag stitches and holding said cloth clamp stationary while barring stitches are formed.

3. In a sewing machine adapted to form a zig zag stitch, a needle bar guide so supported as to be capable of shifting its position, and that of the needle on the machine, in combination with a looper also so supported as to be capable of shifting its position in the machine so as to correspond with the shifting position of the needle, controlling mechanism for moving the needle bar guide and the loopers synchronously so that the looper will always be in position to coact with the needle in forming a stitch, adjustable means for shifting the needle bar guide and looper, cam controlled means for adjusting the shifting means from a neutral position in which the needle bar guide and looper are held stationary in an intermediate position to an operative position in which the shifting means imparts an oscillative movement to the needle bar guide and looper, a cloth feeding clamp and means for actuating said clamp including a cam whereby the clamp is moved, while the needle guide is in its intermediate position, so as to bring about the formation of a series of padding stitches and then moved in a reverse direction while zig zag stitches are formed over the padding stitches.

4. In a sewing machine adapted to form a zig zag stitch, a needle bar guide so supported as to be capable of shifting its position, and that of the needle on the machine, in combination with a looper also so supported as to be capable of shifting its position in the machine so as to correspond with the shifting position of the needle, controlling mechanism for moving the needle bar guide and the loopers synchronously so that the looper will always be in position to coact with the needle in forming a stitch, adjustable means for shifting the needle bar guide and looper, cam controlled means for adjusting the shifting means from a neutral position in which the needle bar guide and looper are held stationary in an intermediate position to an operative position in which the shifting means imparts an oscillative movement to the needle bar guide and looper, a cloth feeding clamp and means for actuating said clamp including a cam whereby the clamp is moved rapidly while the needle guide is in its intermediate position so as to bring about the formation of a series of long padding stitches and then moved slowly and in a reverse direction while zig zag stitches are formed over the padding stitches.

5. In a sewing machine adapted to form a zig zag stitch, a needle guide secured on a vibratory arm in combination with a rock shaft to which said arm is attached, a vibratory lever arm also attached to said rock shaft, a looper shifting bar, a rock shaft carrying a lever connected to said bar, and a second lever connected to the vibratory lever on the rock shaft connected to the needle guide, a vibratory cam actuated lever actuating block, means adjustable in said block and in said vibratory actuated lever for connecting them together, a cam controlling the adjustment of said means and through it the motions of the needle guide and looper bar and intermediate means for varying the extent but not the kind of motion imparted by said cam.

6. In a sewing machine adapted to form a zig zag stitch, a needle guide secured on a vibratory arm in combination with a rock shaft to which said arm is attached, a vibratory lever arm also attached to said rock shaft, a looper shifting bar, a rock shaft carrying a lever connected to said bar, and a second lever connected to the vibratory lever on the rock shaft connected to the needle guide, an adjustable eccentric operated by a driving shaft, a rotatable driven shaft clutch mechanism actuated by said eccentric for giving a step by step motion to said driven shaft, a cam actuated by said shaft, a vibratory block, means adjustable in said block for imparting vibratory motion to the vibrating lever connected to the rock shaft and means actuated by the cam on the driven shaft for moving the adjustable means in the vibratory block and imparting movement to the needle guide and looper bar.

7. In a sewing machine adapted to form a zig zag stitch, a needle guide secured on a vibratory arm in combination with a rock shaft to which said arm is attached, a vibratory lever arm also attached to said rock shaft, a looper shifting bar, a rock shaft carrying a lever connected to said bar, and a second lever connected to the vibratory lever on the rock shaft connected to the needle guide, an adjustable eccentric operated by a driving shaft, a rotatable driven shaft, clutch mechanism actuated by said eccentric for giving a step by step motion to said driven shaft, a cam actuated by said shaft, a vibratory block, means adjustable in said block for imparting vibratory motion to the vibrating lever connected to the rock shaft and adjustable means actuated by the cam on the driven shaft for moving the adjustable means in the vibratory block and imparting movement to the needle guide and looper bar.

8. In a sewing machine adapted to make two rows of zig zag stitches and having two needles and two loopers, means for vibrating them laterally and synchronously, and a cloth feeding clamp, the combination therewith of an adjustable device for varying the lateral vibratory motion of the needles and loopers, a cam for shifting said device to vary said movements at determined periods, means for moving the clamp backwards and forwards including an actuating cam secured on the same shaft as is the vibration controlling cam and means for giving said cam shaft a step by step rotation actuated by a driving shaft and including an adjustable eccentric on said driving shaft.

9. In a sewing machine adapted to make two rows of zig zag stitches and having two needles and two loopers, means for vibrating them laterally and synchronously, and a cloth feeding clamp, the combination therewith of an adjustable device for varying the lateral vibratory motion of the needles and loopers, a cam for shifting said device to vary said movements at determined periods, means for moving the clamp backwards and forwards including an actuating cam secured on the same shaft as is the vibration controlling cam and means for giving said cam shaft a step by step rotation actuated by a driving shaft and including an adjustable device for varying the extent of the step by step movements, and a ratchet clutch.

10. In a sewing machine adapted to form zig zag stitches, a needle bar having two needles secured to it, in combination with a vibratory needle bar guide, a vibratory looper carrying bar having two loopers secured to it, means for simultaneously vibrating the needle bar guide and looper carrying bar, including an adjustable device whereby the extent of the vibration is regulated, a cam acting to shift said adjustable device, formed so as to hold the needles and looper in an intermediate position for a portion of its movement and while two rows of padding stitches are being formed, then to impart to them a wide vibratory movement while a series of bar stitches are formed, then to impart to them a lesser vibratory movement while two rows of zig zag stitches are being formed, and then to impart to them a second wide vibratory movement while a second series of bar stitches are being formed, a cloth holding clamp and means for moving said clamp including a cam formed to give movement to the clamp while the padding stitches are being formed to hold it substantially stationary while the bar stitches are being formed and to move it gradually while the two rows of zig zag stitches are being formed, said cams for controlling the position of the needles and loopers and for actuating the cloth clamp being organized in the machine to move in definite relationship to each other.

11. In a sewing machine adapted to form zig zag stitches, a needle bar having two needles secured to it, in combination with a vibratory needle bar guide, a vibratory looper carrying bar having two loopers secured to it, means for simultaneously vibrating the needle bar guide and looper carrying bar, including an adjustable device whereby the extent of the vibration is regulated, a cam acting to shift said adjustable device, formed so as to hold the needles and loopers in an intermediate position for a portion of its movement and while two rows of padding stitches are being formed, then to impart to them a wide vibratory movement while a series of bar stitches are formed, then to impart to them a lesser vibratory movement while two rows of zig zag stitches are being formed, and then to impart to them a second wide vibratory movement while a second series of bar stitches are being formed, a cloth holding clamp and means for moving said clamp including a cam formed to give movement to the clamp while the padding stitches are being formed to hold it substantially stationary while the bar stitches are being formed to move it gradually while the two rows of zig zag stitches are being formed and to hold it substantially stationary while the second set of bar stitches are being formed, said cams for controlling the position of the needles and loopers and for actuating the cloth clamp being organized in the machine to move in definite relationship to each other, a thread positioning finger longitudinally and laterally movable beneath the needle plate, and means for actuating said finger whereby it is moved forward against the loop threads as the needles are retracted and maintained in such position while the needles move down through the loops and then moved laterally to withdraw it from the loops and then retracted.

12. In a sewing machine adapted to form a double row of zig zag stitches and having thread cutting mechanism operative at the end of the stitch forming operation as described, a thread pulling lever operating to draw through the tension devices a length of thread to be available on restarting the machine, a hinged cloth clamp carrying lever arranged when raised to actuate the thread pulling lever, and mechanism actuated as the stitch forming mechanism completes its operation to raise said clamp carrying lever and to lower it again to clamping position when the machine is restarted.

13. In a sewing machine adapted to form a double row of zig zag stitches as described, mechanism for stopping the machine comprising a recessed disc secured on the driving shaft, in combination with a longitudinally movable bar spring actuated to move it toward the disc and having a detent lug secured to it for holding it in retracted position, a belt shifting arm secured to the bar and carrying a stop finger adapted to contact with the disc and enter the recess therein, a latch lever adapted to engage the detent lug, and means for moving said lever to disengage the lug moving in definite relation to the stitch forming mechanism and so as to release the stop finger carrying bar as the intended stitches are completed permitting the stop finger first to contact with the disc and then to enter the recess therein as described.

14. In a sewing machine adapted to form a double row of zig zag stitches as described, mechanism for stopping the machine comprising a recessed disc secured on the driving shaft, in combination with a longitudinally movable bar spring actuated to move it toward the disc and having a detent lug secured to it for holding it in retracted position, a belt shifting arm secured to the bar and carrying a stop finger adapted to contact with the disc and enter the recess therein, a latch lever adapted to engage the detent lug, and means for moving said lever to disengage the lug moving in definite relation to the stitch forming mechanism and so as to release the stop finger carrying bar as the intended stitches are completed permitting the stop finger first to contact with the disc and then to enter the recess therein as described, an arm secured to the longitudinally movable bar at its front end and a thread cutting knife secured to said arm and operating to cut the threads when the stop finger enters the recess in the disc aforesaid.

15. In a sewing machine adapted to form a double row of zig zag stitches as described, mechanism for stopping the machine comprising a recessed disc secured on the driving shaft, in combination with a longitudinally movable bar spring actuated to move it toward the disc and having a detent lug secured to it for holding it in retracted position, a belt shifting arm secured to the bar and carrying a stop finger adapted to contact with the disc and enter the recess therein, a latch lever adapted to engage the detent lug, and means for moving said lever to disengage the lug moving in definite relation to the stitch forming mechanism and so as to release the stop finger carrying bar as the intended stitches are completed permitting the stop finger first to contact with the disc and then to enter the recess therein as described, a clamp raising lever also secured to the longitudinally movable bar and moving with it and a cam for raising said lever to actuate the clamp over which the lever is moved when the bar is shifted rearward.

16. In a sewing machine adapted to form a double row of zig zag stitches as described, mechanism for stopping the machine comprising a recessed disc secured on the driving shaft, in combination with a longitudinally movable bar spring actuated to move it toward the disc and having a detent lug secured to it for holding it in retracted position, a belt shifting arm secured to the bar and carrying a stop finger adapted to contact with the disc and enter the recess therein, a latch lever adapted to engage the detent lug, and means for moving said lever to disengage the lug moving in definite relation to the stitch forming mechanism and so as to release the stop finger carrying bar as the intended stitches are completed permitting the stop finger first to contact with the disc and then to enter the recess therein as described, a clamp raising lever also secured to the longitudinally movable bar and moving with it and a cam for raising said lever to actuate the clamp over which the lever is moved when the bar is shifted rearward, said cam first serving as a stop acting on the belt shifting bar through the clamp raising lever.

17. A chain stitch sewing machine adapted to form zig zag stitches having in combination two rock shafts located respectively in the upper and lower positions of the machine, means for actuating said shafts synchronously, a needle bar guide secured to the upper rock shaft, a looper shaft longitudinally movable in its bearings and a lever attached to the lower rock shaft and connected to the looper shaft to reciprocate it in synchronism with the needle bar guide.

MICHAEL McCANN.